(12) United States Patent
Then-Gautier

(10) Patent No.: US 10,668,814 B1
(45) Date of Patent: Jun. 2, 2020

(54) MODULE ACTIVE RESPONSE SYSTEM

(71) Applicant: Johnny Then-Gautier, Santo Domingo (DO)

(72) Inventor: Johnny Then-Gautier, Santo Domingo (DO)

(*) Notice: Subject to any disclaimer, the term of this patent is extended or adjusted under 35 U.S.C. 154(b) by 297 days.

(21) Appl. No.: 15/858,848

(22) Filed: Dec. 29, 2017

Related U.S. Application Data

(60) Provisional application No. 62/440,775, filed on Dec. 30, 2016.

(51) Int. Cl.
*B60L 7/10* (2006.01)
*F16D 55/226* (2006.01)
*H02K 7/102* (2006.01)

(52) U.S. Cl.
CPC ............ *B60L 7/10* (2013.01); *F16D 55/226* (2013.01); *H02K 7/102* (2013.01); *B60L 2220/44* (2013.01)

(58) Field of Classification Search
CPC .......... H02K 7/102; H02K 7/006; H02K 7/10; B60L 7/10; B60L 2220/44; B60L 7/00
See application file for complete search history.

(56) References Cited

U.S. PATENT DOCUMENTS

2016/0236658 A1* 8/2016 Rozza .................. B60T 13/748

* cited by examiner

*Primary Examiner* — Nicholas Kiswanto
(74) *Attorney, Agent, or Firm* — Luis Figarella

(57) ABSTRACT

The invention relates to the supplemental generation of energy from a vehicle operation, and specifically to the generation of energy in connection to a vehicle's disc brakes in combination with brushless electric motor-generators. The aim of the invention is to provide a solution making it possible to provide a generator and a disc brake having a compact structure.

1 Claim, 15 Drawing Sheets

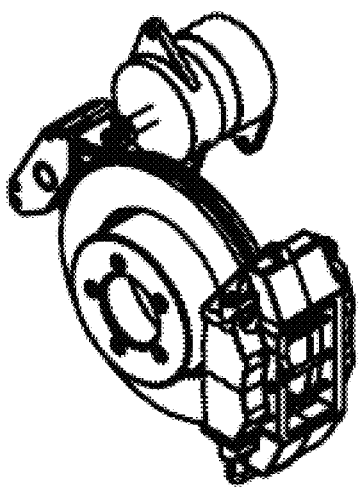# 
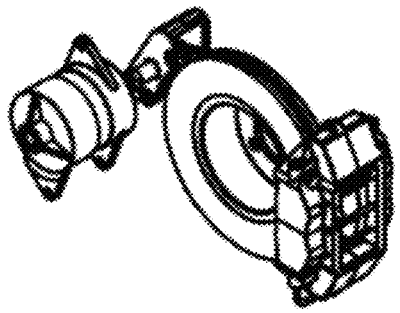
Figure 9
Figure 10

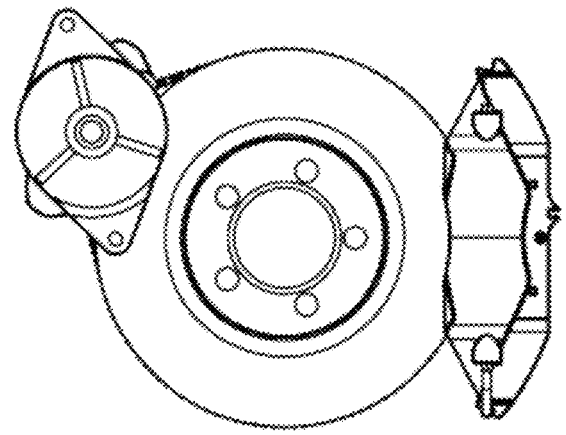
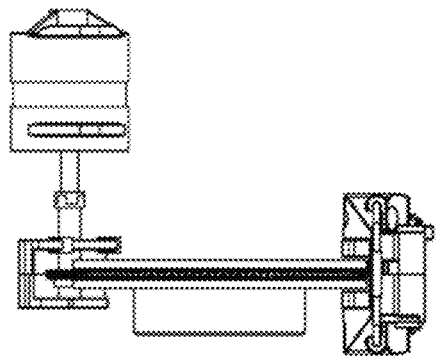
Figure 14
Figure 15
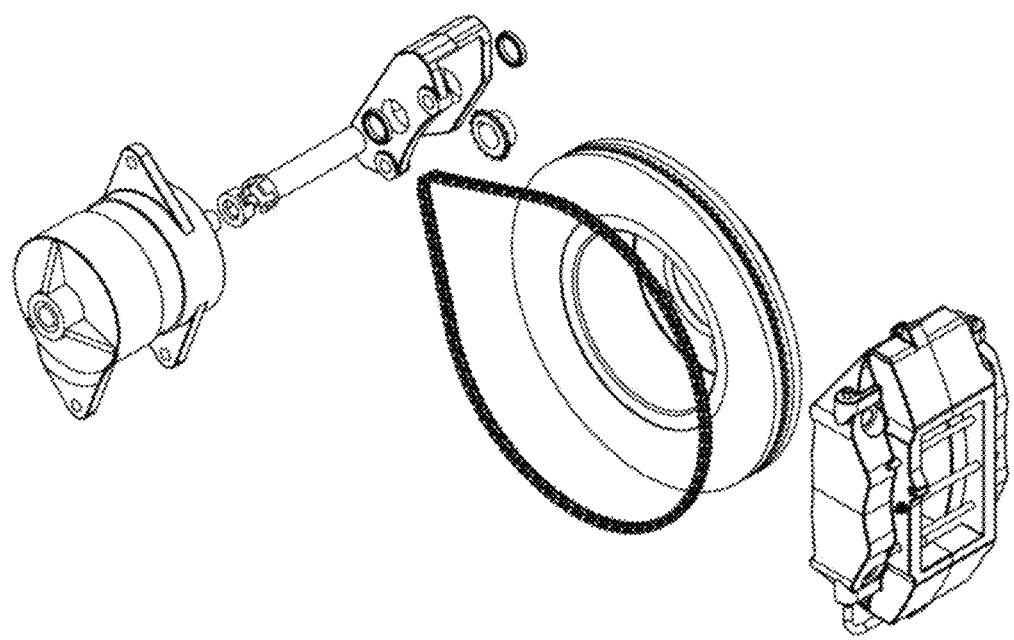
Figure 16

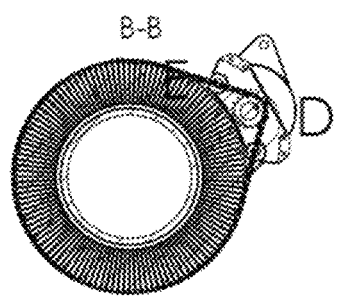
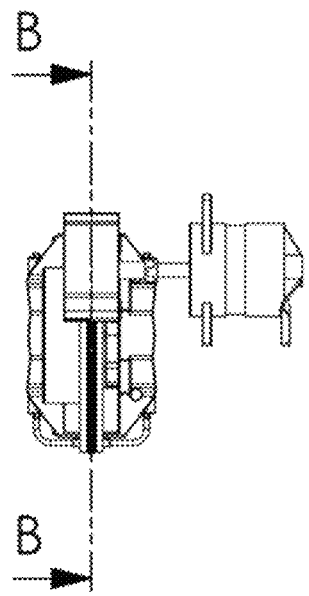
Figure 17
Figure 18
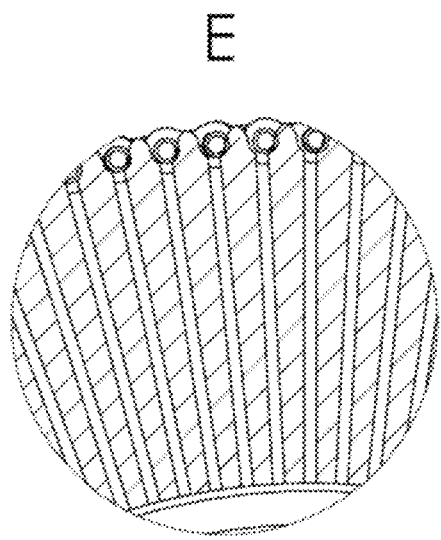
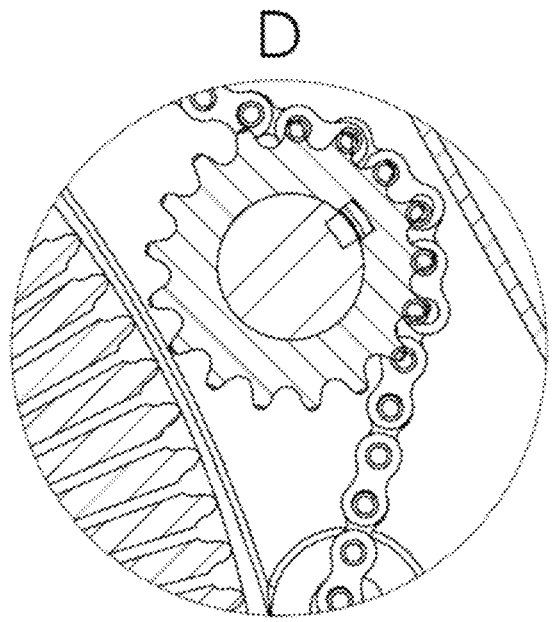
Figure 19
Figure 20

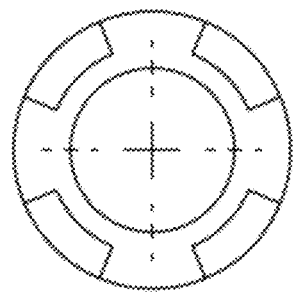
Figure 27        Figure 28
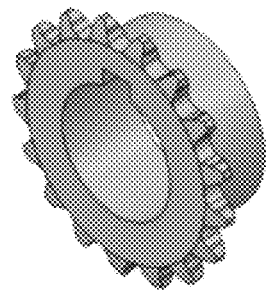
Figure 29A
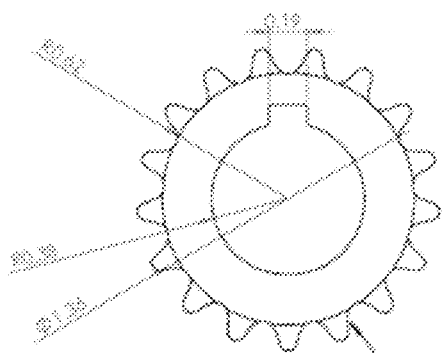
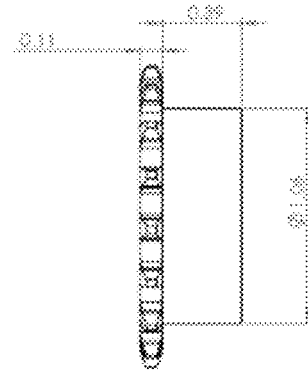
Figure 29B        Figure 29C Alternator Shaft
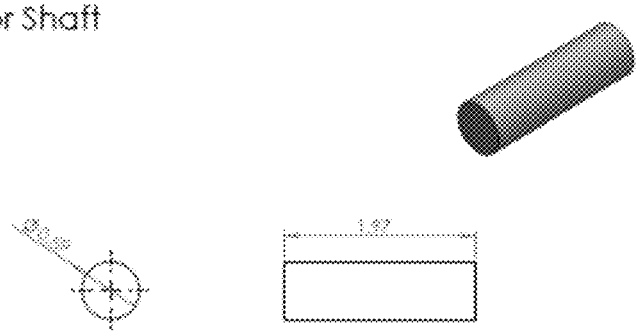
Clutch
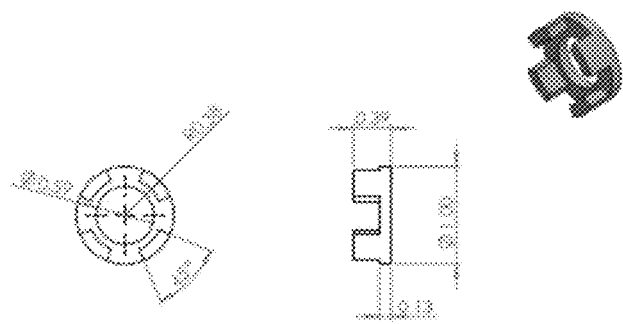
Figure 31
Figure 32
Sprocket Shaft
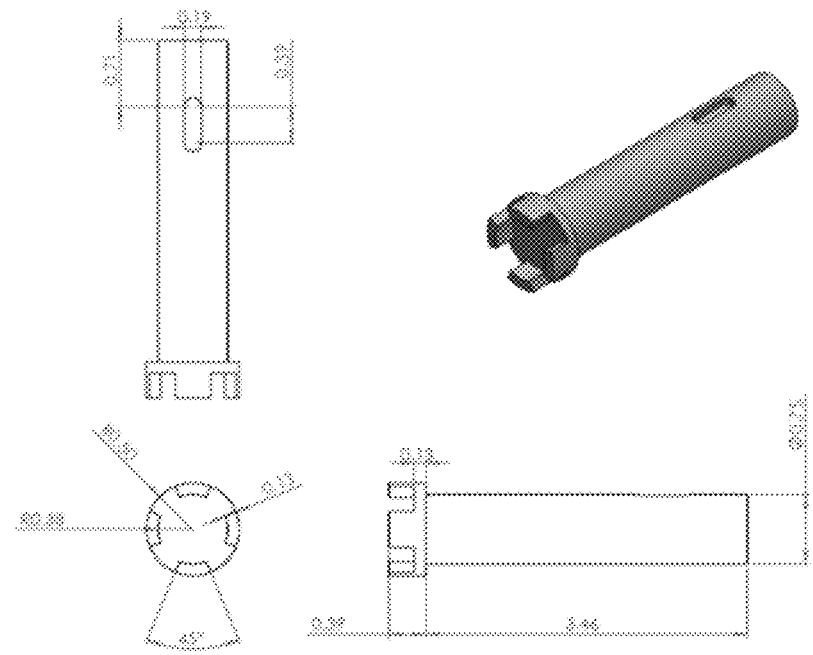

MODULE ACTIVE RESPONSE SYSTEM

CROSS-REFERENCE TO RELATED APPLICATIONS

This application claims priority to U.S. Provisional patent application Ser. No. 62/440,775 titled "Module Active Response System", filed on Dec. 30, 2017 the disclosure of which is herein incorporated by reference in its entirety.

PATENTS CITED

The following documents and references are incorporated by reference in their entirety, Erlston et al (U.S. Pat. Appl. No. 2008/0078631) and Bodenstein et al (U.S. Pat. Appl. No. 2012/0091724).

FIELD OF THE INVENTION

The present invention relates to the supplemental generation of energy from a vehicle operation, and specifically to the generation of energy from a vehicle disc brakes in combination with brushless electric motor-generators.

DESCRIPTION OF THE RELATED ART

A vehicle's motion requires a large amount of energy to be accomplished, and an almost equal (minus transmission losses) is released when the vehicle is stopped. In recent times, hybrid and other vehicles have used the electric motors at the wheels to re-generate energy when braking is applied. In such a fashion, some of the energy spent to make the vehicle move can be recuperated.

Vehicles equipped with disc brakes (automotive, rail vehicle, light aircraft and other similar applications) employ a rotor located on the axle or wheel hub and a caliper mechanism that clamps brake pads against both sides of the rotor, creating friction and generating braking force. In most commercial and military aircraft, multiple rotors are connected, with ventilating slots between them. In conventional disc brake usage, a vehicle's kinetic energy is dissipated as heat when the brakes are applied.

The ability to generate electricity from such braking motion would be advantageous (A battery would then be charged, obviating the need for the vehicle Alternator to operate). What is required is a simple mechanical way in which to couple to said brake rotors.

SUMMARY OF THE INVENTION

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

All references, including any patents or patent applications cited in this specification are hereby incorporated by reference. No admission is made that any reference constitutes prior art. The discussion of the references states what their authors assert, and the applicants reserve the right to challenge the accuracy and pertinence of the cited documents. It will be clearly understood that, although a number of prior art publications are referred to herein, this reference does not constitute an admission that any of these documents form part of the common general knowledge in the art.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

In one aspect the invention is about a vehicle energy apparatus comprising a generator coupled to a shaft, said shaft having mechanical components for coupling with a disc ventilating slot and electronic components for connecting said generator to a vehicle's electrical system.

Other features and advantages of the present invention will become apparent upon examining the following detailed description of an embodiment thereof, taken in conjunction with the attached drawings.

BRIEF DESCRIPTION OF THE DRAWINGS

FIGS. 9 and 10 show isometric views of the disc brake and generator components, according to exemplary embodiments of the invention.

FIG. 14 shows a side view of a chained and coupled disc brake and generator, according to an exemplary embodiment of the invention.

FIG. 15 shows a top view of a chained and coupled disc brake and generator, according to an exemplary embodiment of the invention.

FIG. 16 shows an expanded component view of a chained and coupled disc brake and generator, according to an exemplary embodiment of the invention.

FIG. 17 shows a side view of a chained and coupled disc brake and generator, according to an exemplary embodiment of the invention.

FIG. 18 shows a top view of a chained and coupled disc brake and generator, according to an exemplary embodiment of the invention.

FIG. 19 shows details of the rotating hub, according to an exemplary embodiment of the invention.

FIG. 20 shows details of the sprocket, according to an exemplary embodiment of the invention.

FIGS. 23-28 show various top/side/front views of the engagement/disengagement coupler, according to exemplary embodiments of the invention.

FIGS. 29A-29C show various views of the sprocket, according to exemplary embodiments of the invention.

FIGS. 31-32 show various views of the engagement/disengagement coupler, according to exemplary embodiments of the invention.

Figure 1:
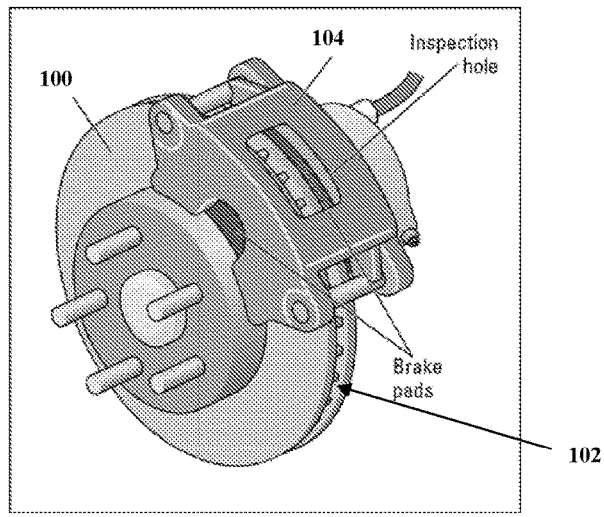
FIG. 1 shows the components of a disc brake system, according to the prior art.
Figure 2:
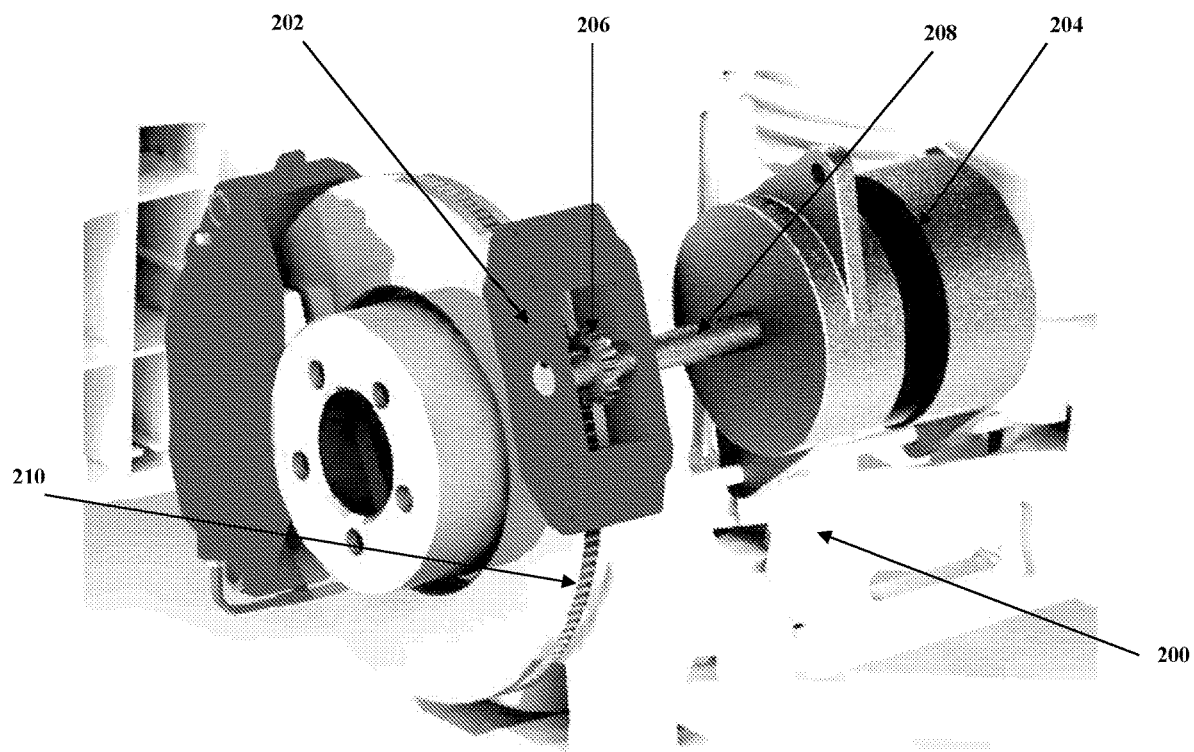
FIG. 2 shows an isometric view of a coupled disc brake and generator, according to an exemplary embodiment of the invention.
Figure 3:
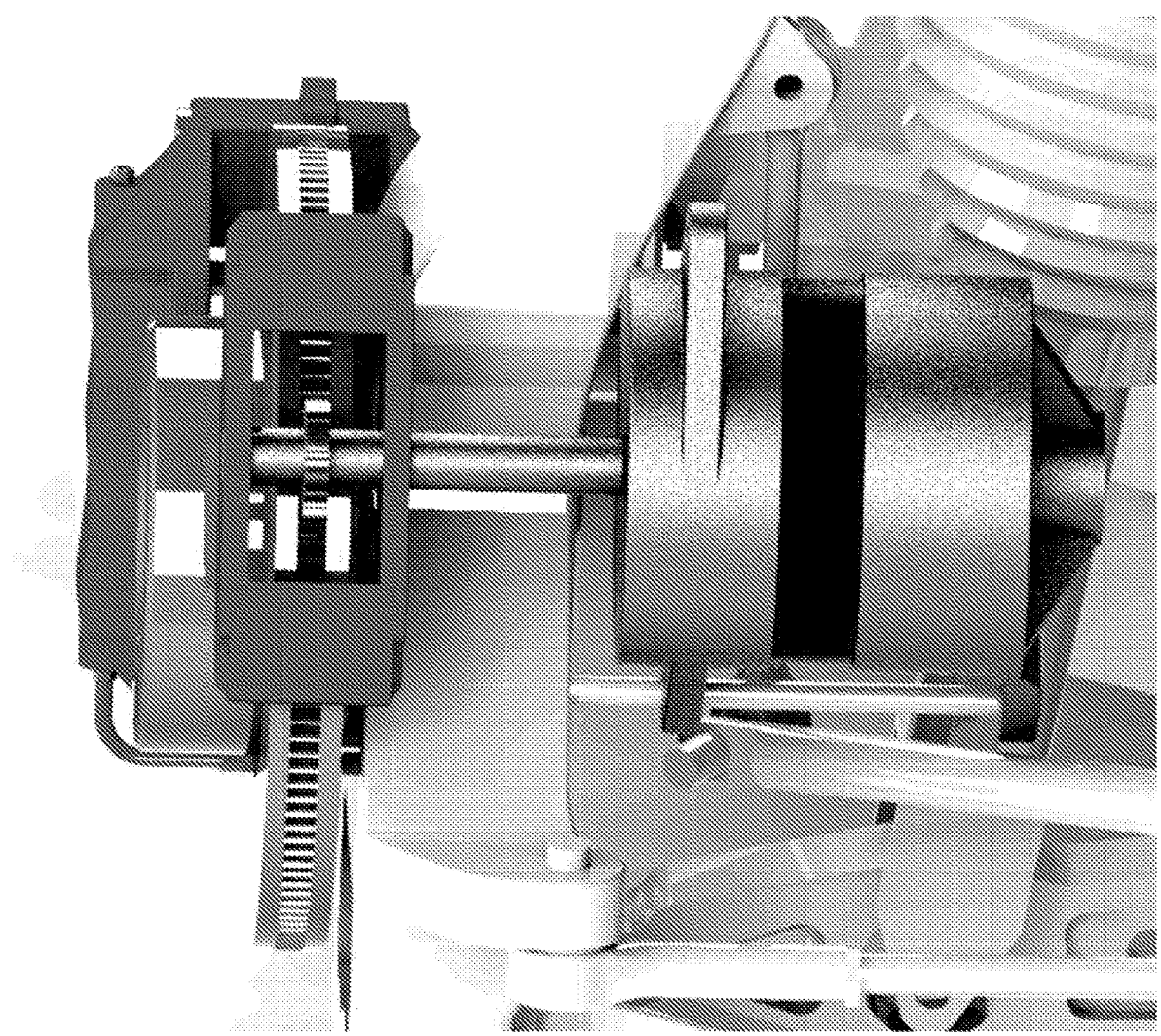
FIG. 3 shows a top view of a coupled disc brake and generator, according to an exemplary embodiment of the invention.
Figure 4:
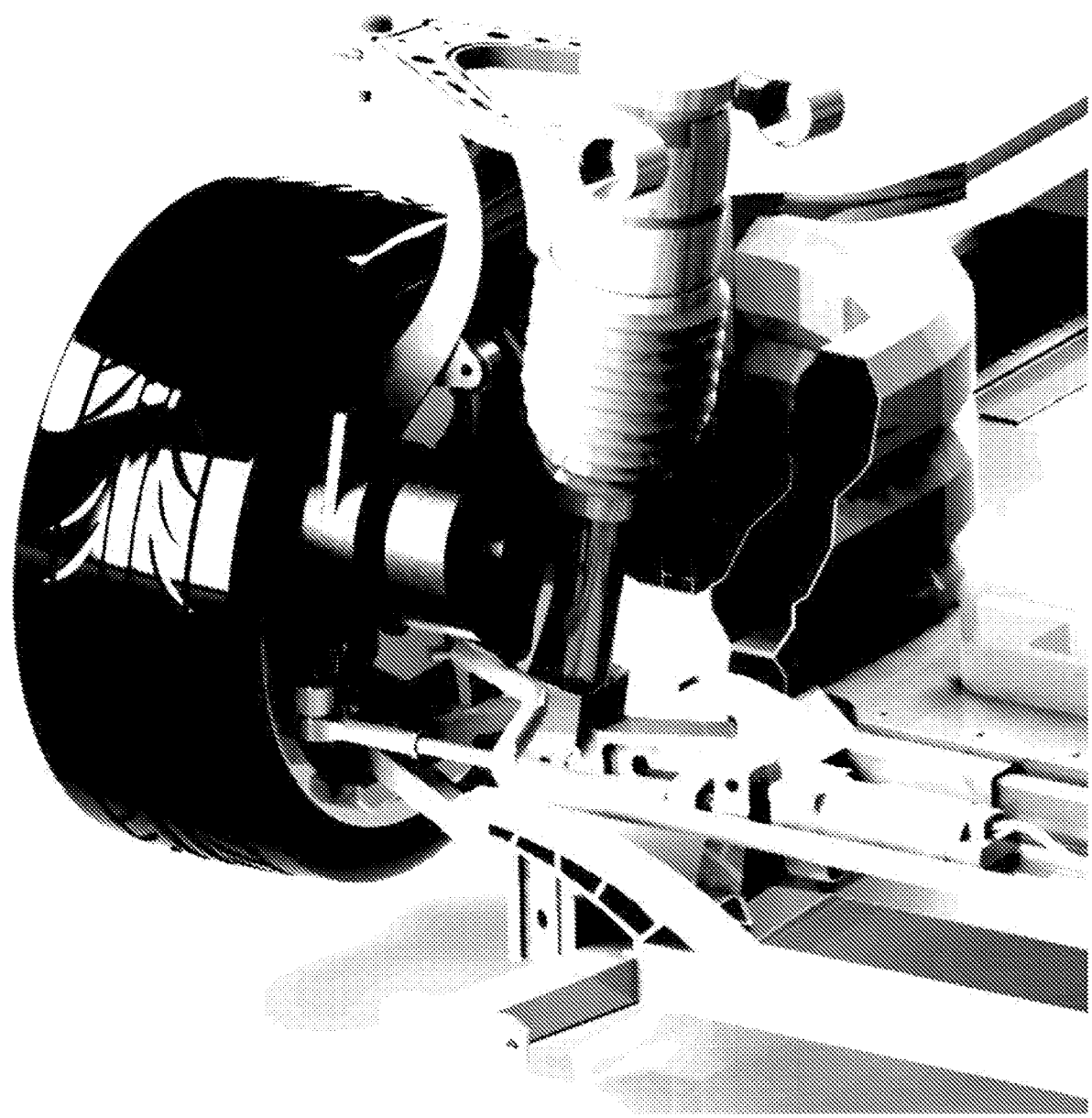
FIG. 4 shows an isometric view of a coupled disc brake and generator including the vehicle tire, according to an exemplary embodiment of the invention.
Figure 5:
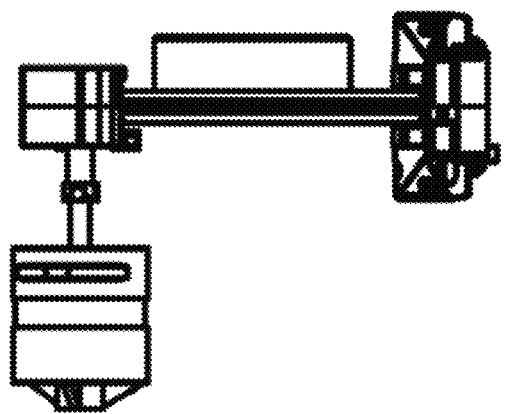
FIGS. 5 and 6 show top views of the coupled disc brake and generator, according to exemplary embodiments of the invention.
Figure 6:
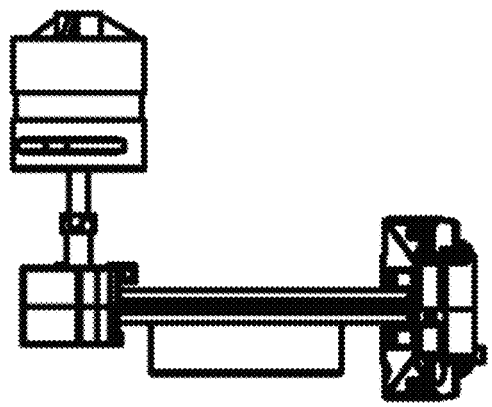
Figure 7:
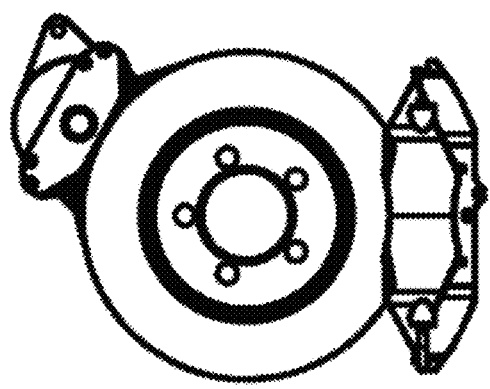
FIGS. 7 and 8 show side views of the disc brake, according to exemplary embodiments of the invention.
Figure 8:
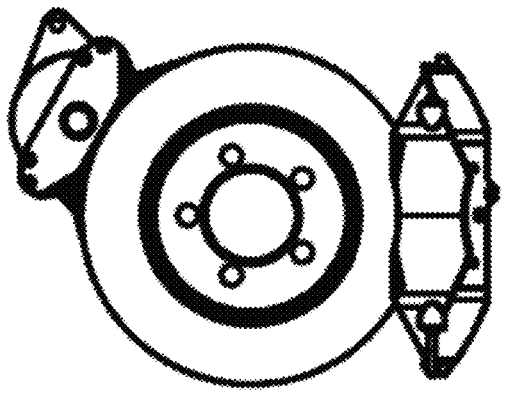
Figure 11:
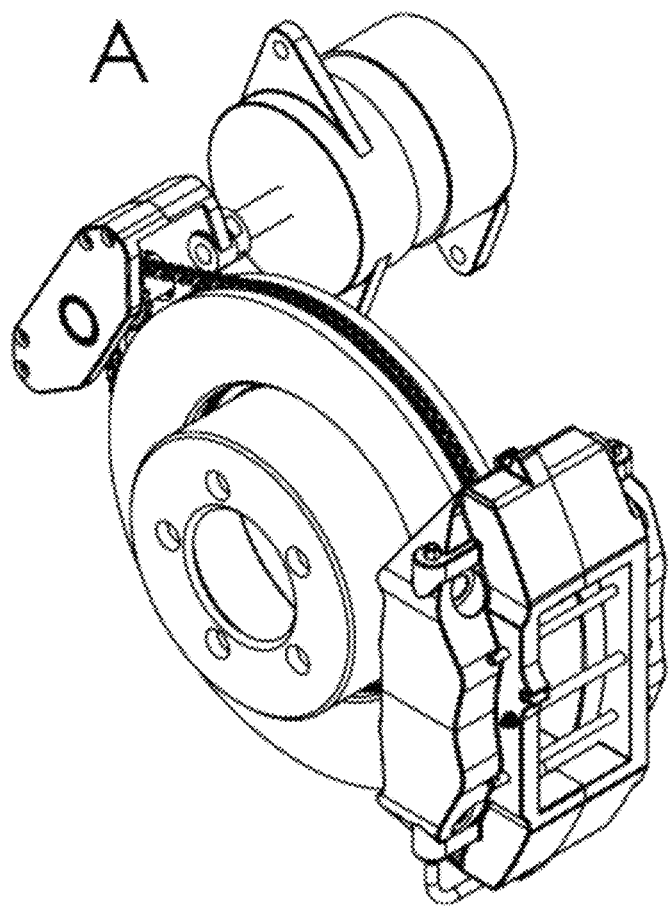
FIG. 11 shows an isometric view of a chained and coupled disc brake and generator including the wheel hub, according to an exemplary embodiment of the invention.
Figure 12:
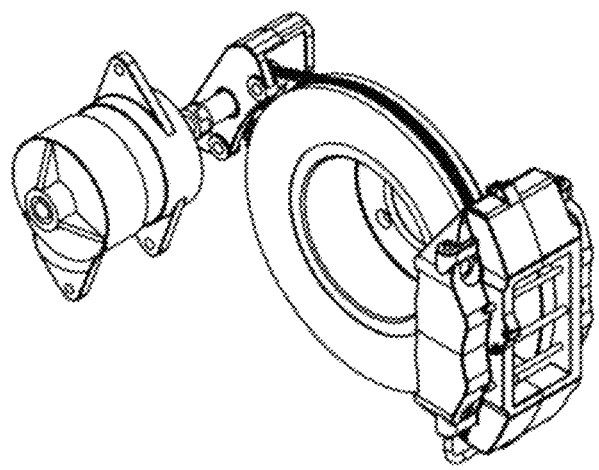
FIG. 12 shows an isometric view of a chained and coupled disc brake and generator, according to an exemplary embodiment of the invention.
Figure 13:
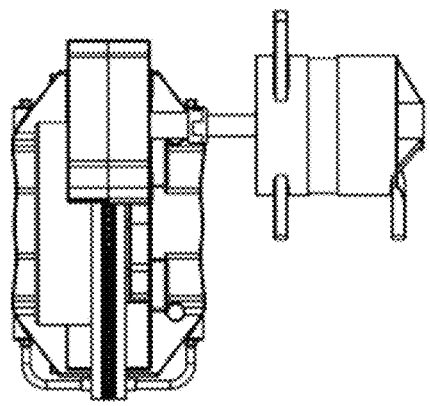
FIG. 13 shows a top view of a chained and coupled disc brake and generator, according to an exemplary embodiment of the invention.
Figure 21:
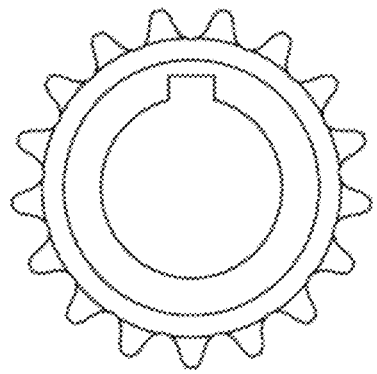
FIGS. 21-22 show top/side views of the sprocket, according to exemplary embodiments of the invention.
Figure 22:
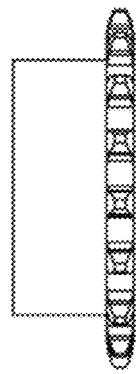
Figure 23:
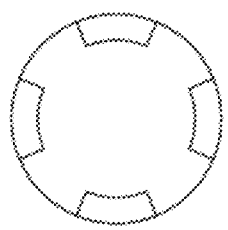
Figure 24:
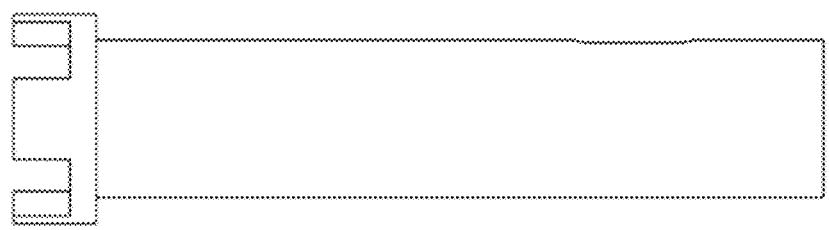
Figure 25:
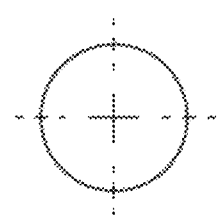
Figure 26:
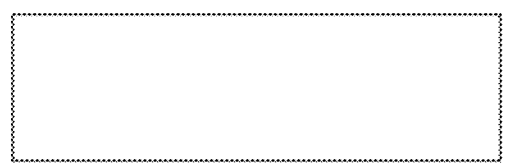
Figure 30A:
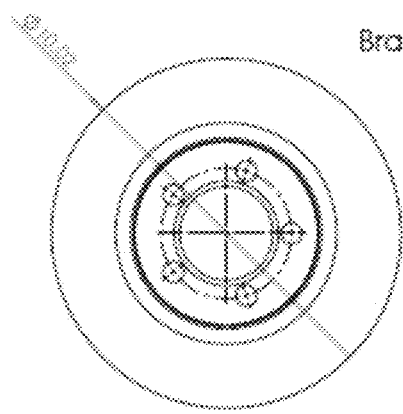
FIGS. 30A-30E show various views of the disk assembly components, according to exemplary embodiments of the invention.
Figure 30B:
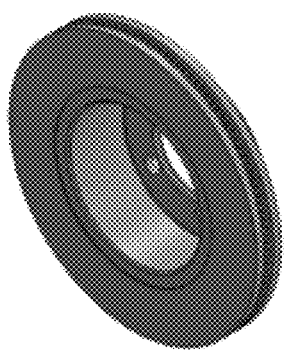
Figure 30C:
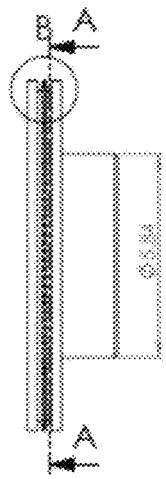
Figure 30D:
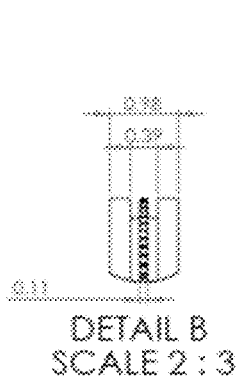
Figure 30E:
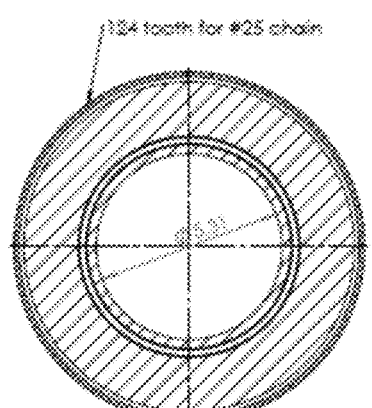
Figure 33:
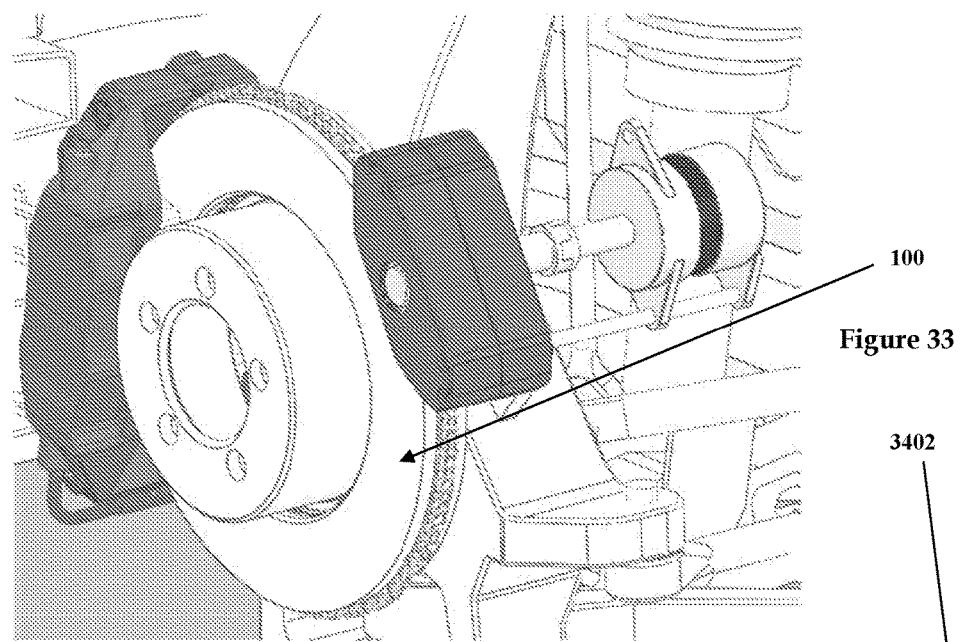
FIG. 33 shows an isometric view of a disc engagement interface, according to an exemplary embodiment of the invention.
Figure 34:
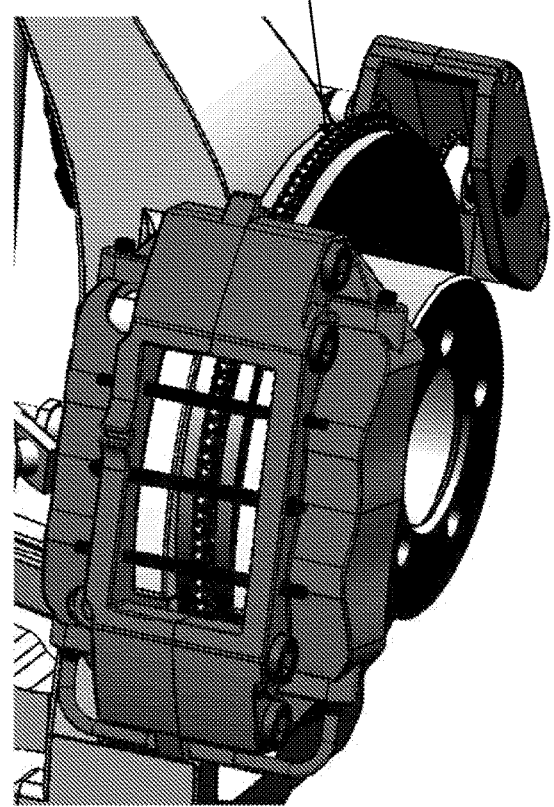
FIG. 34 shows a front view of the disc engagement interface, according to an exemplary embodiment of the invention.
Figure 35:
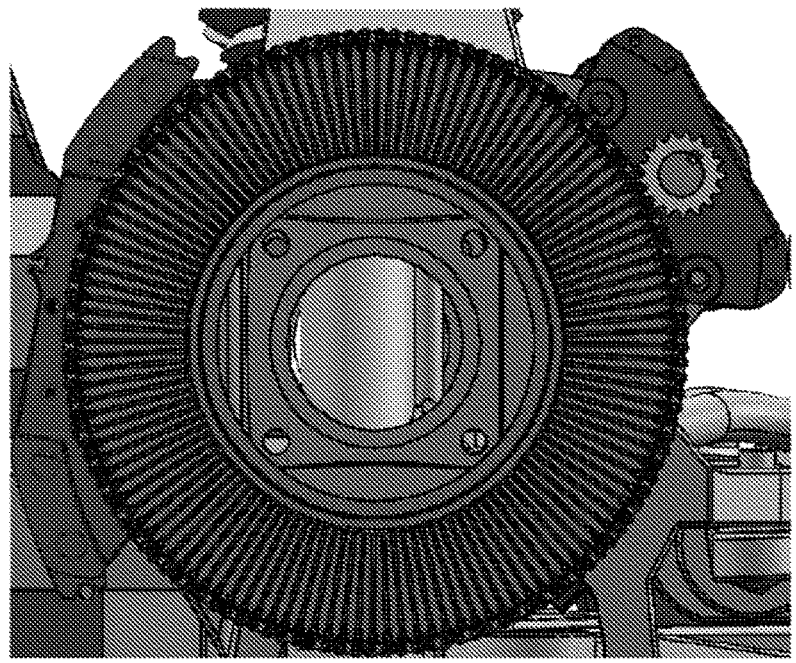
FIG. 35 shows a side view of the disc engagement interface, according to an exemplary embodiment of the invention.
Figure 36:
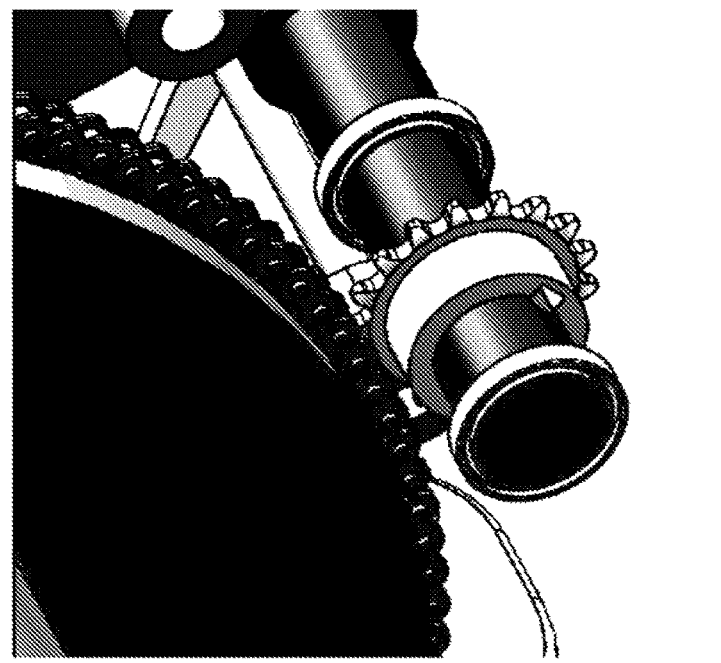
FIG. 36 shows and isometric view of the disc engagement interface, according to an exemplary embodiment of the invention.
Figure 37:
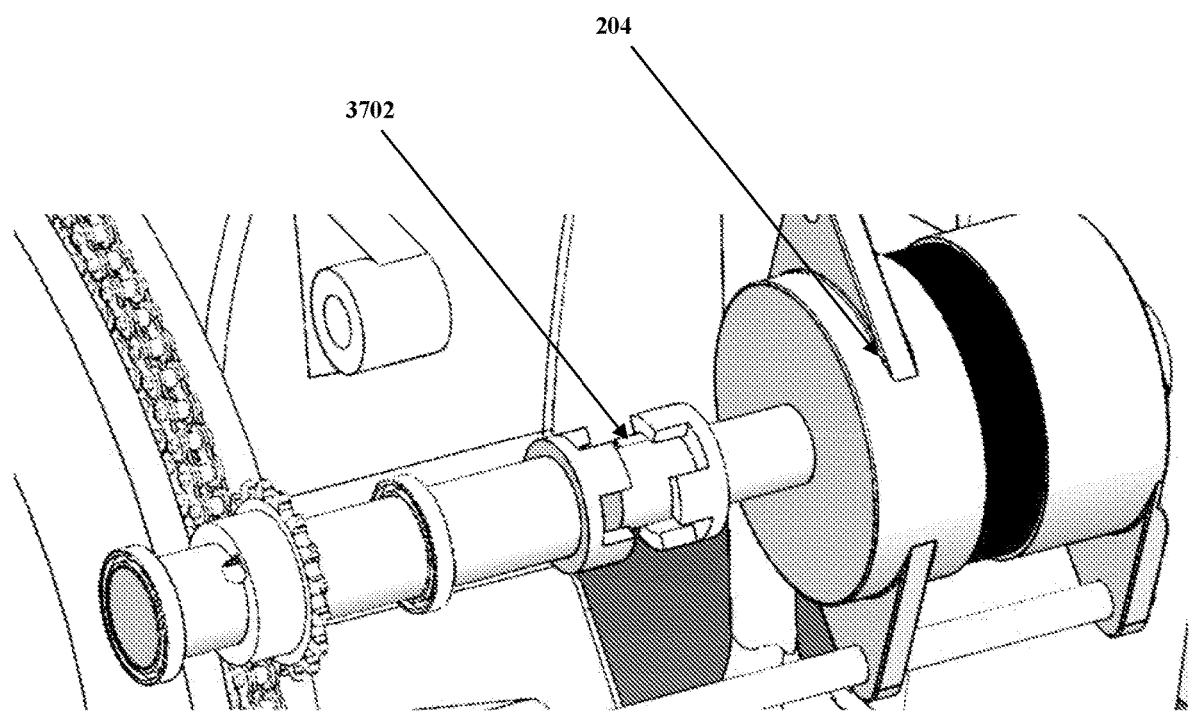
FIG. 37 shows the engagement/disengagement coupler, according an exemplary embodiment of the invention.

The above-described and other features will be appreciated and understood by those skilled in the art from the following detailed description, drawings, and appended claims.

DETAILED DESCRIPTION OF THE PREFERRED EMBODIMENT

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

To provide an overall understanding of the invention, certain illustrative embodiments and examples will now be described. However, it will be understood by one of ordinary skill in the art that the same or equivalent functions and sequences may be accomplished by different embodiments that are also intended to be encompassed within the spirit and scope of the disclosure. The compositions, apparatuses, systems and/or methods described herein may be adapted and modified as is appropriate for the application being addressed and that those described herein may be employed in other suitable applications, and that such other additions and modifications will not depart from the scope hereof.

Simplifications or omissions may be made to avoid obscuring the purpose of the section. Such simplifications or omissions are not intended to limit the scope of the present invention. All references, including any patents or patent applications cited in this specification are hereby incorporated by reference. No admission is made that any reference constitutes prior art. The discussion of the references states what their authors assert, and the applicants reserve the right to challenge the accuracy and pertinence of the cited documents. It will be clearly understood that, although a number of prior art publications are referred to herein, this reference does not constitute an admission that any of these documents form part of the common general knowledge in the art.

As used in the specification and claims, the singular forms "a", "an" and "the" include plural references unless the context clearly dictates otherwise. For example, the term "a transaction" may include a plurality of transaction unless the context clearly dictates otherwise. As used in the specification and claims, singular names or types referenced include variations within the family of said name unless the context clearly dictates otherwise.

Certain terminology is used in the following description for convenience only and is not limiting. The words "lower," "upper," "bottom," "top," "front," "back," "left," "right" and "sides" designate directions in the drawings to which reference is made, but are not limiting with respect to the orientation in which the modules or any assembly of them may be used.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

Referring to FIG. 1 we see the prior art of a disc brake system as presently embodied in the prior art, with a disc 100 that has ventilating slots 102 in the center of the disc 100. Referring to FIGS. 2-37 the MARS generator component 200 is placed along the edge of the disc 100, preferably in a location that does not come in conflict with the operation of the brake calipers 104, and/or any other wheel/brake system operation. In both front and rear wheel configurations the MARS fits within the wheel area, with those in front being able to rotate with wheel movement.

The mechanical coupling to the disc 102 is accomplished by a bracket 202 similar to the disc caliper 104 in operation, that is, it is mechanically configured to remain parallel to the disc surface. The generator and/or generator/storage component 204 has an axle 208 that goes to a ventilating slot 102 coupler 206, which will rotate as the teeth 210 move in response to the disc 102 rotation. Thus, as the wheel moves, the disc 102 moves, and the axle 208 going to the generator moves. The generator 204 may be equipped with a clutch, so that rotation is only used to generate when desired/needed. Similarly, the generation may be electronically shunted, so the load is minimal when not generating energy.

The energy generated may be AC or DC, and either stored locally and/or fed into the vehicle's energy system. This may include feeding into the alternator/battery bus, and/or into a separate vehicle electronics circuitry. In one embodiment, the energy is generated separately from the braking action, whereas in another, the load is proportional to the braking desired by the driver/operator, hence creating energy in addition to braking action.

In an alternate embodiment (FIGS. 33-37), the coupling is accomplished by the placement of a chain 3402 around the edge of the disk 100, facilitating the rotation. The generator 204 is coupled with an engagement/disengagement coupler 3702.

CONCLUSION

In concluding the detailed description, it should be noted that it would be obvious to those skilled in the art that many variations and modifications can be made to the preferred embodiment without substantially departing from the principles of the present invention. Also, such variations and modifications are intended to be included herein within the scope of the present invention as set forth in the appended claims. Further, in the claims hereafter, the structures, materials, acts and equivalents of all means or step-plus function elements are intended to include any structure, materials or acts for performing their cited functions.

It should be emphasized that the above-described embodiments of the present invention, particularly any "preferred embodiments" are merely possible examples of the implementations, merely set forth for a clear understanding of the principles of the invention. Any variations and modifications may be made to the above-described embodiments of the invention without departing substantially from the spirit of the principles of the invention. All such modifications and variations are intended to be included herein within the scope of the disclosure and present invention and protected by the following claims.

The present invention has been described in sufficient detail with a certain degree of particularity. The utilities thereof are appreciated by those skilled in the art. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the foregoing description of embodiments.

The invention claimed is:

1. A vehicle energy apparatus comprising:
a generator coupled to a shaft;
said shaft having mechanical components for coupling with a disc ventilating slot; and
electronic components for connecting said generator to a vehicle's electrical system.

\* \* \* \* \*